United States Patent
Wolverton et al.

(10) Patent No.: US 6,549,338 B1
(45) Date of Patent: Apr. 15, 2003

(54) BANDPASS FILTER TO REDUCE THERMAL IMPACT OF DICHROIC LIGHT SHIFT

(75) Inventors: Gary Wolverton, Dallas, TX (US); Duane Scott Dewald, Dallas, TX (US); N. Jack Gregory, Richardson, TX (US); Roger Carver, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/707,488

(22) Filed: Nov. 7, 2000

Related U.S. Application Data

(60) Provisional application No. 60/165,062, filed on Nov. 12, 1999, and provisional application No. 60/173,253, filed on Dec. 28, 1999.

(51) Int. Cl.[7] .......................... G02B 27/14; G02B 5/04; H04N 9/07; G03B 21/00
(52) U.S. Cl. .................. 359/634; 359/831; 348/338; 353/33
(58) Field of Search ................ 348/265, 335, 348/336, 337, 338, 339; 359/634, 831; 353/31

(56) References Cited

U.S. PATENT DOCUMENTS

| | | | | |
|---|---|---|---|---|
| 3,202,039 A | * | 8/1965 | De Lang et al. | 348/265 |
| 3,602,637 A | * | 8/1971 | Katsuta et al. | 348/338 |
| 4,263,613 A | * | 4/1981 | Tokuhara | 359/634 |
| 4,857,997 A | * | 8/1989 | Fukami et al. | 348/338 |
| 5,644,432 A | * | 7/1997 | Doany | 359/634 |
| 5,743,610 A | * | 4/1998 | Yajima et al. | 353/31 |
| 5,777,796 A | * | 7/1998 | Burstyn | 359/634 |
| 5,934,778 A | * | 8/1999 | Shioya | 353/31 |
| 5,986,815 A | * | 11/1999 | Bryars | 359/634 |
| 6,078,429 A | * | 6/2000 | Lyon | 359/634 |
| 6,101,041 A | * | 8/2000 | Ishibashi et al. | 359/634 |
| 6,231,190 B1 | * | 5/2001 | Dewald | 353/31 |
| 6,330,113 B1 | * | 12/2001 | Slagle et al. | 359/634 |

* cited by examiner

*Primary Examiner*—Georgia Epps
*Assistant Examiner*—Gary O'Neill
(74) *Attorney, Agent, or Firm*—Charles A. Brill; Wade James Brady, III; Frederick J. Telecky, Jr.

(57) ABSTRACT

A color splitting prism assembly (100) comprised of three prisms. Each a dichroic filter at an interface (112) between a first and second of the three prisms reflects a first primary color component of a white light beam passing through the prism assembly. The first primary color component is directed to a first modulator (118). The remaining portions of the white light beam enter a second prism (108) and strike a second dichroic filter at the interface between (124) the second and third prisms. The second dichroic filter separates a second primary color component from the white light beam leaving a third primary color component to travel through the third prism (110) to a third modulator. The second primary color component of the white light beam is directed to a second modulator (128). Light modulated by the first and third modulators travels through the prisms at a slightly different angle than the unmodulated light and therefore reacts differently upon striking the first dichroic filter for the second time. Portions of the light modulated by the first and third modulator travel toward the second modulator (128). An additional filter on or near the exit face (126) of the second prism (108) prevents light in the first and third primary color components from reaching the second modulator (128) and heating the second modulator (128). The light rejected by the additional filter is dispersed by ground glass surfaces of the color splitting prism assembly.

18 Claims, 3 Drawing Sheets

BANDPASS FILTER TO REDUCE THERMAL IMPACT OF DICHROIC LIGHT SHIFT

This application claims priority under 35 USC § 119(e)(1) of provisional application No. 60/165,062 filed Nov. 12, 1999 and provisional application No. 60/173,253 filed Dec. 28, 1999.

FIELD OF THE INVENTION

This invention relates to the field of three-modulator projection display systems, more particularly to display systems using three digital micromirror devices (DMD™) and a color splitting prism assembly.

BACKGROUND OF THE INVENTION

Digital micromirror devices are used to create very high quality images for a wide range of applications. DMD displays range from projectors using one DMD and sequential color methods that weigh less than five pounds, to large venue projectors used in cinematic applications. The large venue projectors use a set of color splitting prisms to separate a white light beam into three primary color light beams and direct the three primary color light beams to three separate modulators. The modulators each modulate a primary color light beam with image data of that primary. The color splitting prism assembly recombines the three primary color light beams into a full-color modulated light beam. The full-color beam is focused onto an image plane to produce the desired image.

A key design criteria for any image projector is the brightness of the projected image. Consumers demand very bright images that easily can be seen in spite of high ambient light levels. Even in display venues such as theaters where the ambient light levels are kept low, the ability to project very bright images enables the use of large display screens. Thus it is commercially advantageous to produce as bright an image as possible.

Projectors that produce very bright images utilize very powerful light sources. Unfortunately, at very high illumination levels, for example 10,000 lumens, the absorption of light by components of the illumination optics creates a tremendous amount of heat. Thus it is critical to minimize the amount of light absorbed by the illumination and projection optics, especially components such as the DMD that are directly in the path of the focused illumination beam. The highly reflective array of mirrors on the surface of the DMD limits the light absorbed by the DMD. The region of light outside the array of mirrors, however, absorbs light and gets very hot during operation of the display projector. The heat absorbed by the DMD limits the maximum power of the lamp used in the projection system and therefore is the limiting factor in projector brightness.

What is needed is a method of reducing the optical heating of the DMD in a projector to enable the use of larger projector lamps.

SUMMARY OF THE INVENTION

Objects and advantages will be obvious, and will in part appear hereinafter and will be accomplished by the present invention which provides a method and system for reducing the optical heating of a spatial light modulator by using a bandpass filter to reduce the thermal impact of dichroic light shift. One embodiment of the present invention provides a method of creating a full color image. The method comprising the steps of: providing a white light beam to a first prism, the white light beam entering a first face of the first prism and traveling to a second face of the prism, reflecting a first primary color portion of the white light beam and passing a first remainder portion through the second face of the first prism and a first face of a second prism, the reflected first primary color portion exiting the first prism through an exit face, modulating the first primary color portion, reflecting a second primary color portion of the first remainder portion at a second face of the second prism and passing a third primary color portion through a third prism, modulating the second and third primary color portions, focusing the first, second, and third modulated primary color portions onto an image plane, and further filtering at least one of the first, second, or third portions at an exit face of the first, second, or third prism.

A second embodiment of the disclosed invention provides a color splitting prism assembly comprising: a first prism, a second prism, a third prism, wherein a first dichroic filter at an interface between the first and second prisms reflects a first primary color component of a white light beam passing through the first prism, and a second dichroic filter at an interface between the second and third prisms reflects a second primary color component of a white light beam passing through the second prism, and an additional filter at an exit face of at least one of the prisms.

A third embodiment of the disclosed invention provides a dichroic prism comprising: a first face for admitting a beam of light, a second face for receiving the beam of light, a first filter formed on the second face, the first filter for reflecting a portion of the beam of light having a first band of wavelengths and for transmitting a second portion of the beam of light, a third face for receiving the reflected portion of the beam of light, and a second filter formed on the third face for transmitting the first portion of light and reflecting light substantially outside the band of the first portion of light.

The disclosed invention provides the technical advantage of preventing light modulated by a first primary color modulator from reaching a second modulator. The changed angle of the modulated light causes a portion of the modulated light to react differently with a dichroic filter—passing through the filter on a second pass when the light was reflected by the filter on a first pass, or vise-versa. If this stray light reaches a second modulator, it will be absorbed by the non-active portions of the second modulator and heat the second modulator. Placing an additional filter on or near the exit face of a prism associated with the second modulator prevents the light modulated by a first modulator from reaching the second modulator and thus reduces the temperature of the second modulator.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new prism design has been developed that greatly reduces the optical heating of the modulators used in the three modulator display system. The new prism design adds a second dichroic filter to a face of a color splitting prism to eliminate dichroic shift light. Dichroic shift light is light that is handled one way by a dichroic filter in a first pass through a prism and a different way by the dichroic filter in a second pass through the filter. Dichroic shift light is created by shifting the angle at which the light passes through the filter between the first pass and the second pass through the filter. In the case of display systems using the DMD, the illumination path is approximately 20° off normal. The reflection path from the "on" mirrors is along the normal, while the reflection path from the "off" mirrors is 40° off the normal and 60° from the illumination path. The change in the angles changes the effective thickness of the layers of the dichroic filter which in turn changes the effective passband of the filter. Thus, some of the light passing through the filter a second time is affected in a different manner the second time through the prism.

Figure 1:
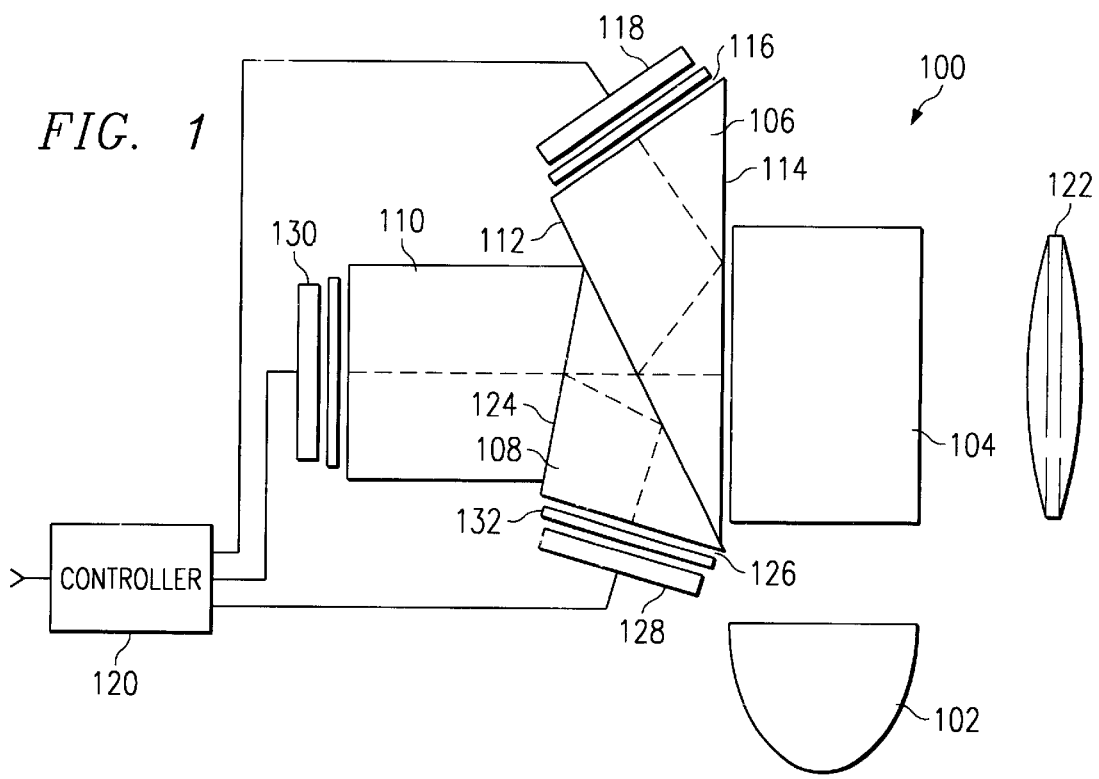
FIG. 1 is a schematic view of a three modulator display system according to one embodiment of the present invention.
Figure 5:
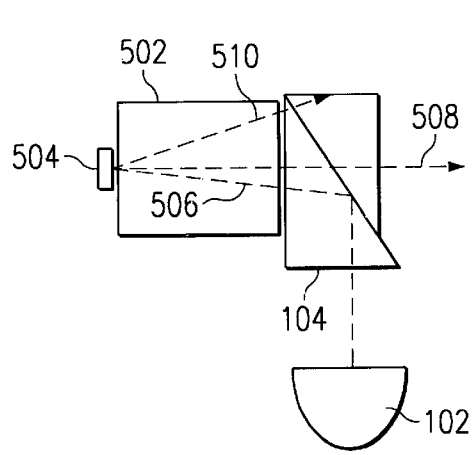
FIG. 5 is a simplified side view of the prism assembly of FIG. 1 showing the angles at which illumination and reflection occur.

FIG. 1 is, a schematic view of a three modulator display system 100 according to one embodiment of the present invention. FIG. 5 is a simplified side view of the prism assembly showing the TIR prism assembly 104 and one other prism. In FIGS. 1 and 5, light from a source 102 enters a TIR prism assembly 104. The TIR prism assembly reflects the illumination light at an interface between two prisms in the TIR assembly. Although the illumination path is generally reflected at the interface between the two TIR prism and the projection path is generally not reflected, the two paths can be exchanged allowing reflection of the projection path an no reflection of the illumination path if desired.

The reflected light enters a color splitting prism assembly comprised of three prisms 106, 108, 110. A light path is shown in FIG. 1 through each of the color splitting prisms. The light path shown in FIG. 1 is for illustrative purposes only. As will be discussed, there are three light paths through the prism assembly—an illumination path, an "on" reflected path, and an "off" reflected path. The path shown in FIG. 1 most closely approximates the "on" reflected path.

The white light beam entering the color splitting prism assembly enters the blue prism 106 and impinges on a blue dichroic prism on the second face 112 of the prism. A blue component of the white light beam is reflected by the blue dichroic filter and the remaining component, yellow light, is allowed to pass into the red prism 108. The reflected blue component is totally reflected on the first face 114 of the blue prism and directed to an exit face 116 through which it passes.

The blue component of the illumination light beam is modulated by a spatial light modulator, in this example a DMD 118, according to image data received from a controller 120. The modulated blue component retraces its path through the blue prism and passes through the TIR prism assembly 104 before being focused by projection lens 122 onto an image plane.

The yellow light that passed through the blue dichroic filter on the second face 112 of the blue prism 106 passes through the red prism 108 and strikes a red filter on the second face 124 of the red prism. The red filter divides the yellow light into a red component that is reflected, and a green component that passes through the red filter. The reflected red component is internally reflected by the first face of the red prism before leaving the red prism 108 through the exit face 126 and being modulated by the red spatial light modulator 128. Like the modulated blue light, the modulated red light retraces its path through the color splitting prism before passing through the TIR prism and being focused onto the image plane.

The remaining green component of the white light beam passes through the green prism 110 and modulated by a green modulator 130 before passing back through the color splitting prism to the image plane.

Figure 2:
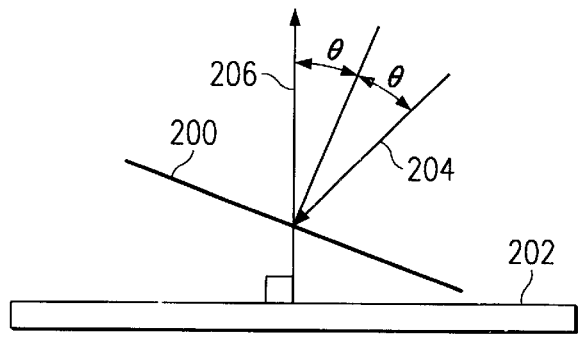
FIG. 2 is a side view of one micromirror element deflected in an "on" position showing the angles of illumination and reflection.

As mentioned above, the prior description was simplified by the assumption that the illumination and projection paths of the display system were coincident. The actual paths diverge by an angle dependent on the deflection angle of the DMD. FIG. 2 shows a side view of one mirror 200 of a DMD deflected to an "on" position. The position is referred to as the "on" position because light reflected by the mirror is directed to the image plane and illuminates a pixel—in effect turning the pixel on.

In FIG. 2, the deflection angle is θ from normal to the DMD substrate 202. The illumination path 204 of the device is 2θ from normal. The light reflected by the mirror in the "on" position travels normal to the DMD substrate 202.

Figure 3:
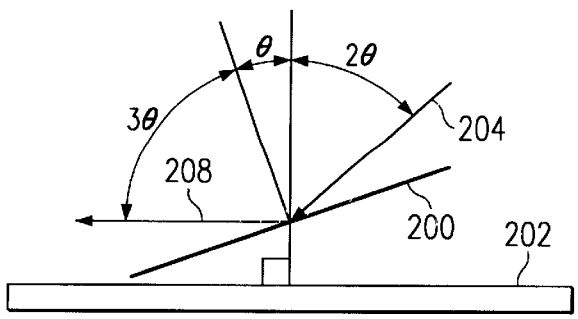
FIG. 3 is a side view of one micromirror element deflected in an "off" position showing the angles of illumination and reflection.

FIG. 3 shows the mirror of FIG. 2 rotated to an "off" position. The position shown in FIG. 3 is called the "off" position because light reflected by the mirror does not reach the image plane and does not illuminate the corresponding pixel—in effect turning the pixel off. Light traveling along the illumination path 204 now strikes the mirror at an angle of 3θ and is reflected by an equal angle, leaving the DMD at an angle 4θ from normal. The angles shown in FIGS. 2 and 3 are greatly exaggerated. Typical DMDs have a deflection angle of approximately 10°, so the illumination 204, reflected on-state 206, and reflected off-state 208 paths are much closer than shown in FIGS. 2 and 3.

FIG. 5 illustrates the effect of the illumination and reflection angles. In FIG. 5, a single prism 502 and modulator 504 is shown in place of the color splitting prism and three modulators of FIG. 1. Illumination light 506 entering the prism 502 approaches the DMD 504 at an angle, typically 20° from normal. Light 508 reflected by the "on" mirrors leaves the modulator along a path normal to the surface of the DMD. Light 510 reflected by the "off" mirrors leaves the modulator along a path 40° from normal. Unlike the idealized light paths of FIG. 1, the actual illumination and reflection paths through the prisms diverge due to the illumination angle of the DMD.

The difference in the illumination 204, reflected-on 206, and reflected-off 208 paths creates filtering errors that lead to unnecessary heating of the modulators, especially the red modulator 128. The filtering errors are due to the nature of the dichroic filters. Dichroic filters are fabricated of multiple layers of various dielectrics. Depending on the index of refraction between various layers, certain wavelengths are reflected by the interface between the layers. The thickness of the layers relative to the wavelength of the incident light determines whether the reflected light interferes constructively or destructively—resulting in a highly reflective or a non-reflective interface. The angle at which the light strikes the layers determines the length of the optical path between the layers and determines the reflectance of the layers at a given wavelength. For light entering and exiting the simplified prism 502 of FIG. 5, the effective wavelength of the reflected "on-light" is shorter than the effective wavelength of the illumination light, and the effective wavelength of the "off-light" is longer than the effective wavelength of the illumination light.

Figure 4:
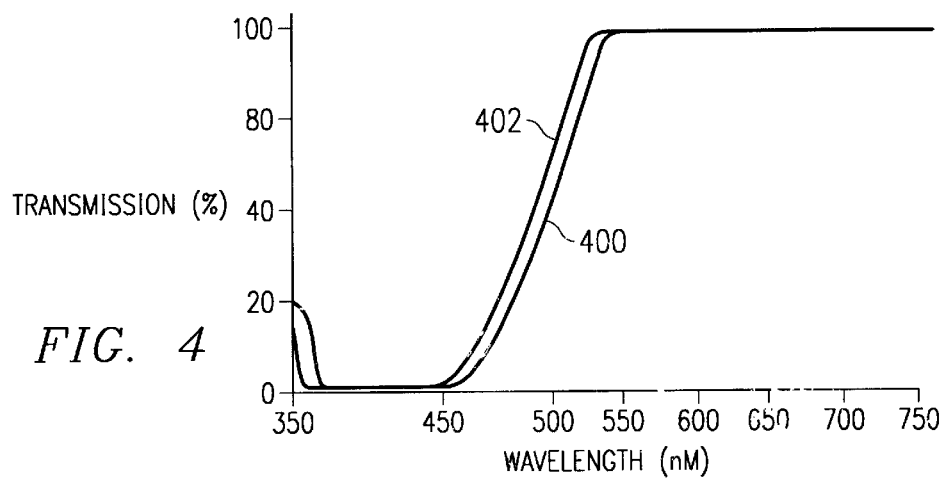
FIG. 4 is a plot of the response of a dichroic filter to illumination light and off-state reflected light.
Figure 6:
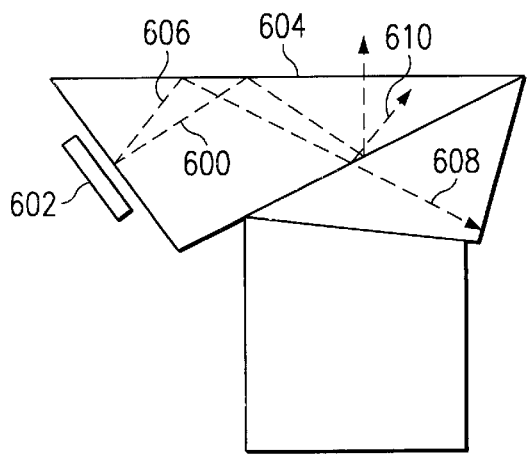
FIG. 6 is a plan view of the color splitting prism showing the path of the off-state blue light that reaches the red modulator.

FIG. 4 is a plot of the response of a blue dichroic filter to light striking the filter at two angles. The first response plot 400 shows the effect of the dichroic filter on illumination light striking the filter at an angle of incidence equal to 2θ, or 20°. The second plot 402 shows the response of the dichroic filter on reflected off-state light striking the filter at an angle of 4θ, or 40°. Since the off-state light strikes the filter at a shallower angle, the path through the layers is longer and the effect of the filter is shifted. FIG. 6 shows the light 600 reflected by the blue modulator 602 in the on-state passing through the blue prism 604. The light strikes the blue dichroic filter at a steeper angle and, having a shorter effective wavelength, is reflected by the dichroic filter. The off-state light 606 reflected by the blue modulator has a dichroic shift that results in some of the off-light 608 passing through the blue dichroic coating and some 610 being reflected by the coating. Thus, some of the light reflected by the blue filter on the first pass through the prism passes through the blue filter on the second pass. This off-state blue light passes through the red prism and strikes the red modulator, heating it.

The off-state blue light beam striking the red modulator 128 is not centered on the red modulator, but rather strikes the red modulator near a corner of the modulator. Striking the modulator off-center compounds the heating effect because the light misses the highly reflective sea of mirrors in the active area of the red modulator. Missing the highly reflective portion of the device means the light off-state blue light is more likely to be absorbed by the red modulator and increases the heating of the device. Not only is the off-state blue light absorbed by the red modulator, since the off-state blue light primarily strikes one corner of the modulator the package is not heated uniformly. The non-uniform heating places thermal stresses on the package and mounting hardware that can crack the modulator package or misalign the red modulator. The off-state blue light passing through the blue filter and striking the red modulator provides about 2 W of heat to the red modulator in a 10,000 Lumen system.

Figure 7:
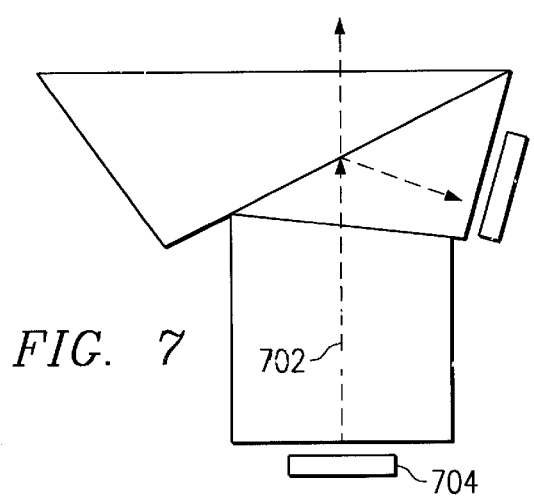
FIG. 7 is a plan view of the color splitting prism showing the path of the on-state green light that reaches the red modulator.

In addition to the off-state blue light that is transmitted on its second pass through the blue dichroic filter, the green on-state light can also heat the red modulator. As shown in FIG. 7, the angle of the on-state light 702 reflected by the green modulator 704 has a dichroic shift that causes it to be partially reflected by the blue filter when it strikes the blue filter a second time traveling along the on-state path. The on-state green light reflected by the blue filter and striking the red modulator adds about 4 W of heat to the red modulator in a 10,000 Lumen system.

Figure 8:
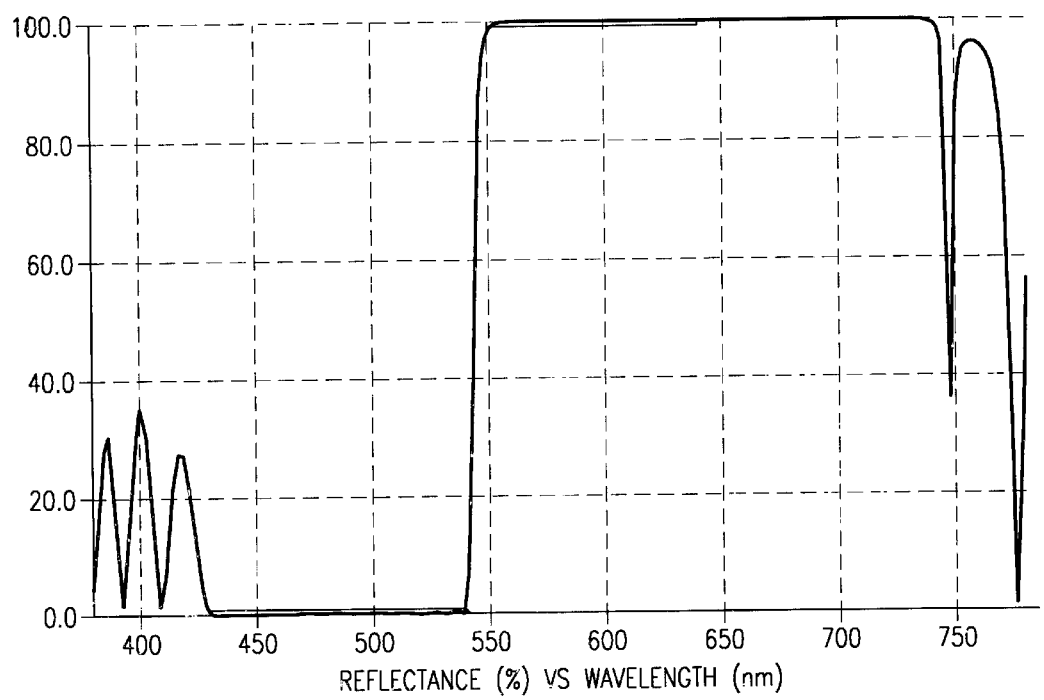
FIG. 8 is a plot of the blue dichroic coating.
Figure 9:
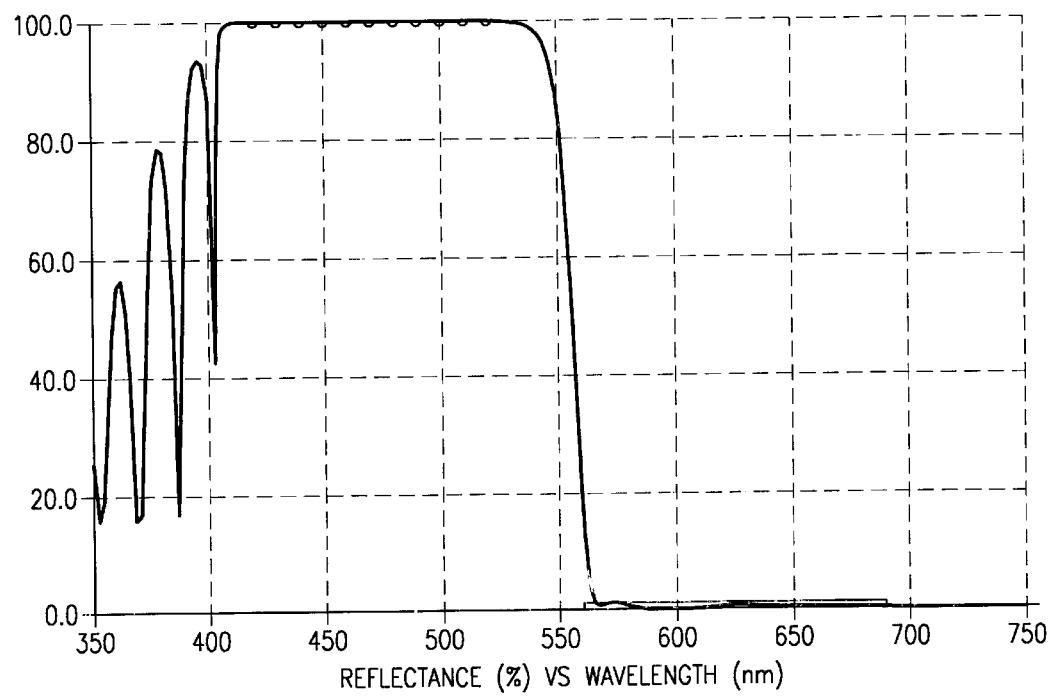
FIG. 9 is a plot of the additional red coating applied to the second face of the red prism.

The solution described herein is to use a second red filter 132 at the exit face 126 of the red prism. The second red filter rejects the off-state blue light and the on-state green light keeping the light in the prism assembly where it eventually is dispersed by a ground glass prism surface. The second red filter 132 can either be a separate filter as shown in FIG. 1, or a filter fabricated on the exit face 126 of the red prism 108. The second filter reduces the optical heat load described above from about 6 W to 1 W in a 10,000 Lumen system. This reduces the heat load to the mounting plate holding the red modulator by 90% or more. FIG. 8 is a plot of the response of the blue dichroic filter. FIG. 9 is a plot of the response of the additional filter applied to the red prism.

Placing the second red filter 132 on the red prism increases the complexity of the prism and makes the prism much more difficult to manufacture. Using a separate second red filter 132 allows the use of a very simple filter, but creates a separate part that must be aligned in the display system.

While the red modulator is typically the hottest modulator in a display system, the other modulators can also receive out-of-band light. As the size of the lamp used increases, the out-of-band light received by the other modulators will become more of a problem to the system designer. The out-of-band light at the other modulators can be eliminated by the use of a second filter at either or both of the other modulators. As with the second red filter, the second filters are either fabricated on the exit face of the color splitting prism, or provided as a separate filter.

Thus, although there has been disclosed to this point a particular embodiment for a method and system for reducing the thermal load created by dichroic light shift, it is not intended that such specific references be considered as limitations upon the scope of this invention except insofar as set forth in the following claims. Furthermore, having described the invention in connection with certain specific embodiments thereof, it is to be understood that further modifications may now.suggest themselves to those skilled in the art, it is intended to cover all such modifications as fall within the scope of the appended claims.

What is claimed is:

1. A method of creating a full color image, the method comprising the steps of:

providing a white light beam to a first prism, said white light beam entering a first face of said first prism and traveling to a second face of said first prism;

reflecting a first primary color portion of said white light beam and passing a first remainder portion through said second face of said first prism and a first face of a second prism, said reflected first primary color portion exiting said first prism through an exit face;

modulating said first primary color portion to reflect a modulated first primary color portion to said second face of said first prism;

reflecting a second primary color portion of said first remainder portion at a second face of said second prism to exit an exit face of said second prism;

passing a third primary color portion through a third prism to exit an exit face of said third prism;

modulating said second and third primary color portions to reflect modulated second and third primary color portions to said second face of said second prism;

focusing said first, second, and third modulated primary color portions onto an image plane; and further filtering at one said exit face to block light modulated at another exit face.

2. The method of claim 1 said further filtering step comprising the step of further filtering said first portion at the exit face of said first prism.

3. The method of claim 1 said further filtering step comprising the step of further filtering said second portion at the exit face of said second prism.

4. The method of claim 1 said further filtering step comprising the step of further filtering said third portion at the exit face of said third prism.

5. A color splitting prism assembly comprising:
   a first prism;
   a second prism;
   a third prism, wherein a first dichroic filter at an interface between said first and second prisms reflects a first primary color component of a white light beam passing through said first prism, and a second dichroic filter at an interface between said second and third prisms reflects a second primary color component of a white light beam passing through said second prism; and
   an additional filter at an exit face of at least one of said prisms said additional filter selected to reflect light passing through one of said first or second dichroic filters after previously being reflected by said one of said first or second dichroic filters.

6. The color splitting prism assembly of claim 5, wherein said additional filter is a separate filter at the exit face of said first prism.

7. The color splitting prism assembly of claim 5, wherein said additional filter is a filter formed on the exit face of said first prism.

8. The color splitting prism assembly of claim 5, wherein said additional filter is a separate filter at the exit face of said second prism.

9. The color splitting prism assembly of claim 5, wherein said additional filter is a filter formed on the exit face of said second prism.

10. The color splitting prism assembly of claim 5, wherein said additional filter is a separate filter at the exit face of said third prism.

11. The color splitting prism assembly of claim 5, wherein said additional filter is a filter formed on the exit face of said third prism.

12. A dichroic prism comprising:
    a first face for admitting a beam of light;
    a second face for receiving said beam of light;
    a first filter formed on said second face, said first filter for reflecting a first portion of said beam of light having a first band of wavelengths and for transmitting a second portion of said beam of light;
    a third face for receiving said reflected portion of said beam of light; and
    a second filter formed on said third face for transmitting said first portion of light and reflecting light substantially outside the band of said first portion of light.

13. The method of claim 1, said further filtering comprising:
    further filtering light at said exit face of said first prism to reflect light substantially outside said first primary color portion.

14. The method of claim 1, said further filtering comprising:
    further filtering light at said exit face of said second prism to reflect light substantially outside said second primary color portion.

15. The method of claim 1, said further filtering comprising:
    further filtering light at said exit face of said third prism to reflect light substantially outside said third primary color portion.

16. The prism assembly of claim 5, said additional filter comprising:
    an additional filter at an exit face of said first prism, said additional filter operable to reflect light substantially outside said first primary color component.

17. The prism assembly of claim 5, said additional filter comprising:
    an additional filter at an exit face of said second prism, said additional filter operable to reflect light substantially outside said second primary color component.

18. The prism assembly of claim 5, said additional filter comprising:
    an additional filter at an exit face of said third prism, said additional filter operable to reflect light substantially within one of said first and second primary color components.

* * * * *